United States Patent [19]
Pozzo

[11] Patent Number: 5,593,253
[45] Date of Patent: Jan. 14, 1997

[54] ROUTER BIT WITH INTERCHANGEABLE KNIVES

[76] Inventor: Gianfranco Pozzo, Via Padova 3, 33010 Feletto U., Italy

[21] Appl. No.: 379,394

[22] Filed: Jan. 26, 1995

[51] Int. Cl.⁶ ........................................ B26D 1/12
[52] U.S. Cl. ........................................ 407/36; 407/54
[58] Field of Search ..................... 407/59, 53, 54, 407/42, 34, 36, 37, 40

[56] References Cited

U.S. PATENT DOCUMENTS

| | | | |
|---|---|---|---|
| 1,286,194 | 12/1918 | Abbott, Jr. | 407/54 |
| 3,293,727 | 12/1966 | Simms | 407/42 X |
| 3,688,367 | 9/1972 | Bennett | 407/48 X |
| 4,243,348 | 1/1981 | Paige | 408/186 |
| 4,883,391 | 11/1989 | Tsujimura et al. | 407/48 |

FOREIGN PATENT DOCUMENTS 2048835  4/1972  Germany ...................... 407/54

*Primary Examiner*—William R. Briggs
*Attorney, Agent, or Firm*—Shefte, Pinckney & Sawyer

[57] ABSTRACT

A router bit includes a generally elongate body portion, a shank portion for mounting to a rotating machine, and a knife support head disposed oppositely from the shank portion. The knife support head includes a pair of recesses formed therein to accept interchangeable knives which are adjustable longitudinally to compensate for knife wear and loss of diametrical dimension due to resharpening of the knives.

3 Claims, 2 Drawing Sheets

ROUTER BIT WITH INTERCHANGEABLE KNIVES

BACKGROUND OF THE INVENTION

The present invention relates broadly to rotary cutting apparatus and, more specifically, to a router bit for selective attachment to a rotating machine with the router bit having interchangeable and adjustable knives.

At the outset, it should be noted that the term "knife" is used interchangeably with "blade" and "cutting tip" to define any assembly, device, or apparatus disposed at the endmost point of the router bit to provide cutting action on a workpiece. Further, while the present invention is more ideally suited for working wood and wood products, including fiberboard, chipboard, and MDF, the principles disclosed herein are equally applicable to cutting metal or any other material linked only in their susceptibility to cutting operations.

In working wood, it is often required to perform cutting or shaping operations, especially in panels and cabinet doors, to provided a contoured surface or other custom configuration. Typically, these operations are performed by machines known as copying machines using routers with both conventional, i.e., manual control or with computer numerical control (CNC).

Router bits used with such apparatus typically will utilize knifes having a shaped or profiled cutting edge or the edge may be straight. The knives are typically made using tool steel or solid carbide and can be fixed to a cutter head using screws so that they can be dismounted, resharpened, and interchanged.

Typically, the router bits for profiling and boring with profiled knives are formed of a single steel block wherein seats for the knives are machined.

The removable or interchangeable knives offer several advantages over knives which are brazed, welded, or otherwise permanently affixed to the router bit. Obviously, an advantage is that the knives may be interchanged when worn or removed and resharpened to reform the profile. However, certain disadvantages are present. Initially, the advantages associated with resharpening are somewhat offset by the reduction of cutting diameter imposed by the reduction of knife size during sharpening. Therefore, small diameters may not be possible with resharpened knives. Further, the knives may be difficult to reposition in their original orientation on the bit, resulting in a poor finish on the workpiece. There also exists a safety hazard should the knives come loose during cutting operation and, finally, the knives typically offer poor chip unloading performance.

However, brazed or otherwise permanently mounted knives offer the advantage of safety and improved initial balancing yet present several problems of their own. Initially, any resharpening of the knives will cause a loss of the original diametrical dimensions. Further, the bits themselves must be interchanged when different profiles are to be cut. Finally, when the knives are worn, the entire router bit must be replaced.

SUMMARY OF THE INVENTION

It is accordingly an object of the present invention to provide a router bit which addresses the above-discussed problems by providing interchangeable knives which are positively fixed to the router bit.

It is further an object of the present invention to provide a router bit using interchangeable knives which are adjustable to restore any loss of diametrical dimension due to resharpening of the blades.

To that end, the router bit for attachment to a rotating machine for cutting predetermined configurations in a workpiece includes a generally longitudinally extending body portion; an arrangement for mounting the bit to a rotating machine formed at a first end of the body portion and an assembly for supporting a plurality of knives in a cutting orientation formed at a second end of the body portion. The knife support assembly includes a multiple sided knife holding head for removably attaching a plurality of knives thereto which includes at least two generally longitudinally extending recessed, opposed knife guide surfaces which are inclined and formed in a converging relationship toward the second end portion.

In this manner, the present invention provides a simplified router bit with interchangeable knives enabling the knives to be resharpened and correctly repositioned after they are removed for sharpening and finally enables them to be adjusted to recover the dimensional loss due to wear, resharpening, or both.

It is further preferred that the present invention include a knife support shoulder formed adjacent the recessed surface for positioning and supporting a knife. This feature provides a solid base for knife abutment to substantially prevent the loosening of the knives.

The present invention preferably further includes a plurality of knives for mounting to the knife support assembly, with the knives having a generally elongate slot formed therein and oriented generally longitudinally with respect to the body portion. The knives are preferably mounted to the knife holding head by screws extending through the slot for threaded receipt in the knife holding head, with the knives being generally longitudinally adjustable on the knife holding head to an extent according to the length of the slot.

It is further preferred that the present invention include a locking screw threadedly mounted to the knife holding head to extend laterally into contact with the knives for locking the knives into a cutting position on the knife holding head. By the above, the present invention provides a simple and safe router bit which provides the advantages associated with interchangeable knives and minimizes the disadvantages associated with knife wear and subsequent resharpening.

DESCRIPTION OF THE PREFERRED EMBODIMENT

Figure 1:
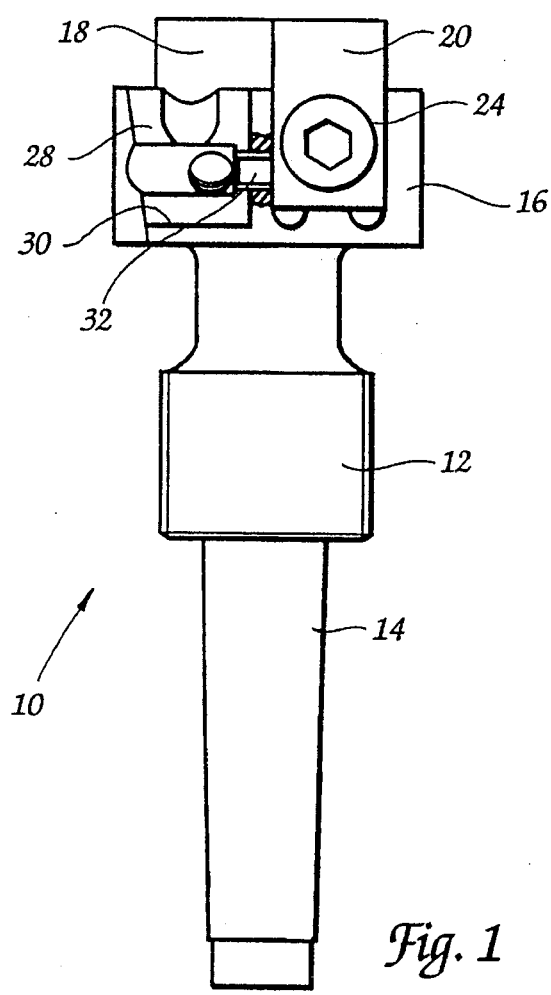
FIG. 1 is a front view of a router bit according to the preferred embodiment of the present invention.

Turning now to the drawings and, more particularly to FIG. 1, a router bit according to the present invention is illustrated generally at 10 and includes a generally elongate body portion 12 having a shank portion 14 projecting outwardly from one end thereof to facilitate mounting the router bit 10 on a rotating machine (not shown) for cutting operations. A knife support head 16 is provided for mounting knife blades thereto. The knife support head 16 is mounted to the body portion 12 and is configured in a generally abbreviated pyramidal configuration having a plurality of sides converging toward the endmost point of the bit 10.

Figure 3:
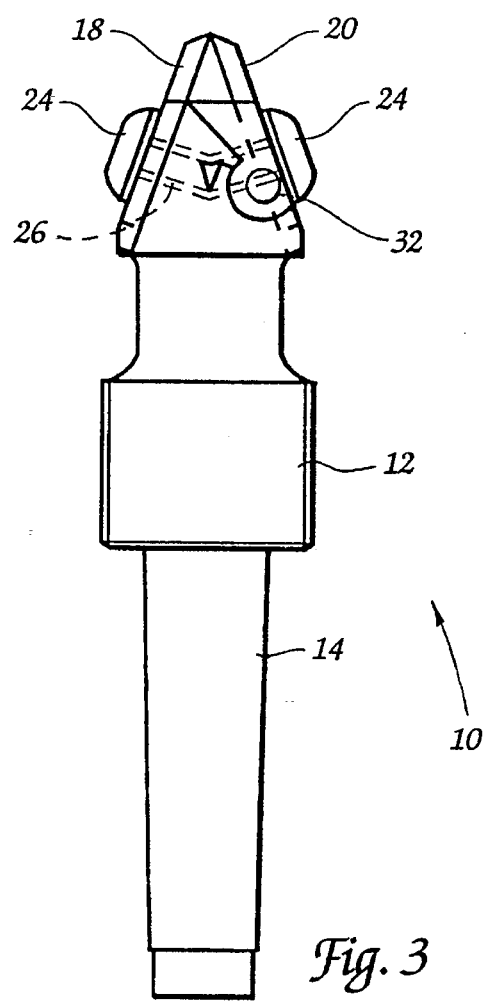
FIG. 3 is a side view of the router bit illustrated in FIG. 1.
Figure 5:
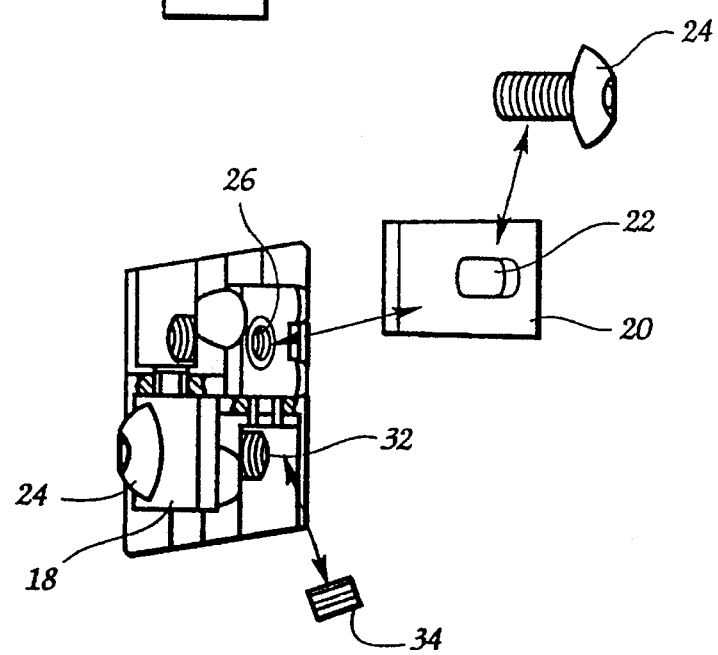
FIG. 5 is a top view of the router bit illustrated in FIG. 4 featuring an exploded view of one knife.

A pair of knives 18, 20 are configured for mounting to the knife support head 16. As best seen in FIGS. 1, 3, and 5, the knives are generally rectangular, relatively thin planar members having an elongate slot 22 formed therein. The knives include cutting edges which converge to a point when mounted to the bit 10 as seen in FIG. 3. A knife mounting screw 24 is associated with each knife 18, 20 and is configured for threaded receipt in a threaded opening 26 formed in the knife support head 16.

The knife support head 16 includes a pair of recesses 28 formed therein which correspond in depth generally to the width dimension of the blades 20 to provide a flush mount as best seen in FIG. 3.

Figure 4:
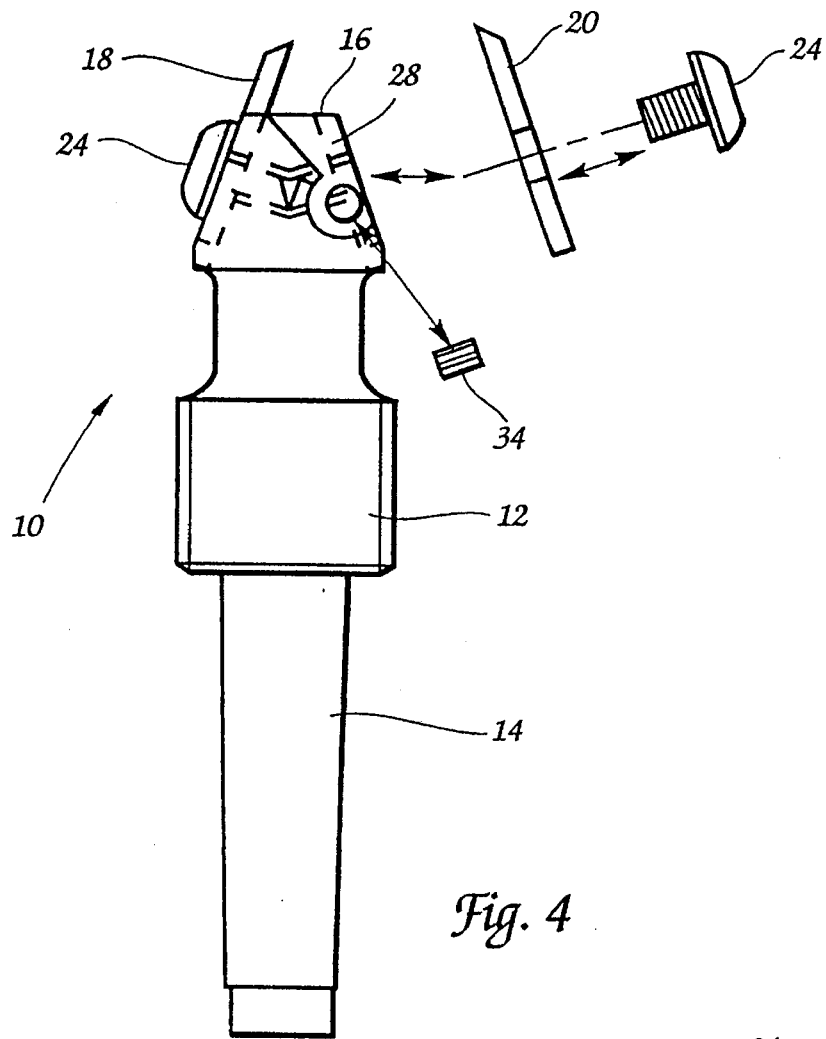
FIG. 4 is a side view of the router bit illustrated in FIG. 3 featuring an exploded view of one knife.

As best seen in FIG. 1, each recess 28 is formed to leave a shoulder 30 formed in the knife support head 16. The shoulder 30 provides a lower abutment member for the knife blades 18, 20 to enhance the stabilization thereof. To further enhance the stabilization and retention of the knives 18, 20 by the knife support head 16, a bore 32 is formed in the knife support head 16 to extend laterally with respect to the bit 10 and emerges therefrom adjacent the knife blades 18, 20. As seen in FIGS. 4 and 5, a set screw 34 is provided for insertion in the bore 32 and, as will be seen, it is tightened against the side of each respective knife 18, 20 to lock the respective knife 18, 20 into a cutting position.

Figure 2:
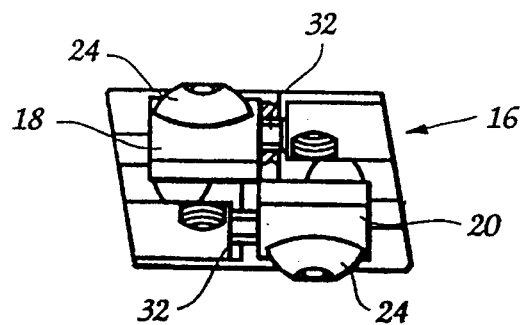
FIG. 2 is a top view of the router bit illustrated in FIG. 1.

In operation, the knives 18, 20 are chosen for whatever configuration of cut is desired. As illustrated in FIG. 2 and FIG. 3, the knives 18, 20 are arranged with the cutting edges straight across and configured for cutting a circle or a line if the router (not shown) is moved laterally with respect to the router bit 10. Once the knives 18, 20 are chosen, they are mounted to the bit 10 in a manner disclosed in FIGS. 4 and 5. The slot 22 is positioned over the threaded opening 26 in a rough approximation of the final knife position. The mounting screw 24 is inserted through the elongate slot 22 and threaded into the opening 26 to be tightened down at least partially. This process is repeated for the second blade. When both blades are moved upwardly or downwardly into the desired alignment, as best seen in FIG. 1, a set screw 34 is inserted in each of the lateral bores 32 and tightened against the blades with the primary mounting screw 24 being tightened thoroughly in the process. The bit 10 is then ready for mounting on a rotating machine.

Once the knives become dull, they can be removed by reversing the above-described procedure, resharpened, and by repeating the above-described procedure, remounted to the knife support head 16. Further, prior to the tightening of the set screws 34 and fully tightening the mounting screws 24, the knives may be longitudinally adjusted to compensate for any knife material removed during sharpening or to enhance the alignment of the knives.

By the above, the present invention provides a simple router bit with interchangeable blades which are longitudinally adjustable to compensate for changes in the diametrical dimension of the cutting blades after resharpening.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A router bit for attachment to a rotating machine for cutting predetermine configurations in a workpiece comprising:

generally longitudinally extending body portion;

means for mounting aid bit to a rotating machine formed at a first end of said body portion;

a knife support head for removably attaching a plurality of knives thereto and including at least two generally longitudinally extending recessed opposed knife guide surfaces which are inclined and formed in a converging relationship toward said second end portion, a knife support Shoulder formed adjacent each of said recessed knife guide surfaces for positioning and supporting a knife, and a threaded bore in each of said recessed guide surfaces;

a plurality of knives for mounting to said knife support head, each of said knives including a generally elongate slot formed therein and oriented generally longitudinally with respect to said body portion, each of said knives being mounted to the knife support head by screws extending through said slot for threaded receipt in said threaded bore of said knife support head with said knives being generally longitudinally adjustable along said knife support head to an extent according to the length of said slot.

2. A router bit according to claim 1 and further comprising a locking screw threadedly mounted to said knife support head to extend laterally into contact with said knives for locking said knives into a cutting position on said knife support head.

3. A router bit according to claim 1, and further comprising a pair of laterally opposed side bolsters formed adjacent each of said recessed guide surfaces for laterally positioning and supporting a knife.

* * * * *

UNITED STATES PATENT AND TRADEMARK OFFICE
CERTIFICATE OF CORRECTION

PATENT NO. : 5,593,253
DATED : January 14, 1997
INVENTOR(S) : Gianfranco Pozzo

It is certified that error appears in the above-identified patent and that said Letters Patent is hereby corrected as shown below:

Column 4, line 25, delete "predetermine" and insert therefor --predetermined--.

Column 4, line 27, before "generally" insert --a--.

Column 4, line 28, delete "aid" and insert therefor --said--.

Column 4, line 34, delete "recessed" and insert therefor --recessed,--.

Column 4, line 37, delete "Shoulder" and insert therefor --shoulder--.

Signed and Sealed this

Fourth Day of August, 1998

Attest:

BRUCE LEHMAN

*Attesting Officer*  *Commissioner of Patents and Trademarks*